(12) United States Patent
Isaksson

(10) Patent No.: US 11,878,603 B2
(45) Date of Patent: Jan. 23, 2024

(54) CONTACTOR CONTROL SYSTEM AND METHOD FOR CONTROLLING A CONTACTOR

(71) Applicant: Ningbo Geely Automobile Research & Development Co., Ltd., Ningbo (CN)

(72) Inventor: Björn Isaksson, Mölndal (SE)

(73) Assignee: Ningbo Geely Automobile Research & Dev. Co., Ltd., Ningbo (CN)

(*) Notice: Subject to any disclaimer, the term of this patent is extended or adjusted under 35 U.S.C. 154(b) by 658 days.

(21) Appl. No.: 16/872,887

(22) Filed: May 12, 2020

(65) Prior Publication Data

US 2020/0269718 A1    Aug. 27, 2020

Related U.S. Application Data

(63) Continuation of application No. PCT/CN2018/114892, filed on Nov. 9, 2018.

(30) Foreign Application Priority Data

Nov. 13, 2017 (EP) ..................................... 17201270

(51) Int. Cl.
*B60L 58/10* (2019.01)
*H02M 1/36* (2007.01)
*H02M 3/02* (2006.01)

(52) U.S. Cl.
CPC ............... *B60L 58/10* (2019.02); *H02M 1/36* (2013.01); *H02M 3/02* (2013.01)

(58) Field of Classification Search
CPC .. B60L 58/10; B60L 2240/547; B60L 3/0046; H02M 1/36; H02M 3/02; H02J 2207/20; Y02T 10/70; H02H 9/001
See application file for complete search history.

(56) References Cited

U.S. PATENT DOCUMENTS

| 5,440,180 A | 8/1995 | DeVault |
| 9,413,184 B2 | 8/2016 | Smith |

(Continued)

FOREIGN PATENT DOCUMENTS

| CN | 107554335 A | 1/2018 |
| CN | 207339369 U | 5/2018 |

(Continued)

OTHER PUBLICATIONS

Extended European Search Report from corresponding European Patent Application No. 17201270.0, dated Apr. 26, 2018, 9 pages.

(Continued)

*Primary Examiner* — Elim Ortiz
(74) *Attorney, Agent, or Firm* — Tucker Ellis LLP

(57) ABSTRACT

A contactor control system includes a switching member, a high voltage load, a high voltage energy storage, a bi-directional DC/DC-converter operatively connected to the switching member, a high-voltage capacitor operatively connected to the high-voltage load, and a low voltage energy storage operatively connected to the bi-directional DC/DC-converter, wherein the switching member is adapted to connect and disconnect the high voltage energy storage to and from the high voltage load, where the bi-directional DC/DC-converter is adapted to pre-charge the high-voltage capacitor to a predefined voltage value from the low voltage energy storage before the switching member is closed and adapted to discharge the high-voltage capacitor to the low voltage energy storage when the switching member has been opened. The advantage of the invention is that a DC-link capacitor can be charged from and discharged to a low voltage battery by using a bi-directional DC/DC-converter. Energy losses can thus be minimized.

14 Claims, 3 Drawing Sheets

(56) References Cited

U.S. PATENT DOCUMENTS

| | | | |
|---|---|---|---|
| 2002/0140397 A1* | 10/2002 | Hasegawa | H02J 7/1423 |
| | | | 320/104 |
| 2003/0029654 A1* | 2/2003 | Shimane | B60K 6/28 |
| | | | 903/917 |
| 2013/0268158 A1* | 10/2013 | Kurita | B60L 3/003 |
| | | | 701/32.8 |
| 2015/0084404 A1 | 3/2015 | Hashim | |
| 2016/0023559 A1 | 1/2016 | Cho | |
| 2016/0144725 A1 | 5/2016 | Nozawa | |
| 2017/0113567 A1* | 4/2017 | Koketsu | B60L 15/007 |

FOREIGN PATENT DOCUMENTS

| | | |
|---|---|---|
| CN | 108422889 A | 8/2018 |
| EP | 3110652 A1 | 1/2017 |
| JP | 2007318849 A | 12/2007 |
| WO | 2015086179 A1 | 6/2015 |

OTHER PUBLICATIONS

International Search Report and Written Opinion from corresponding International Patent Application No. PCT/CN2018/114892, dated Feb. 11, 2019, 13 pages.

* cited by examiner

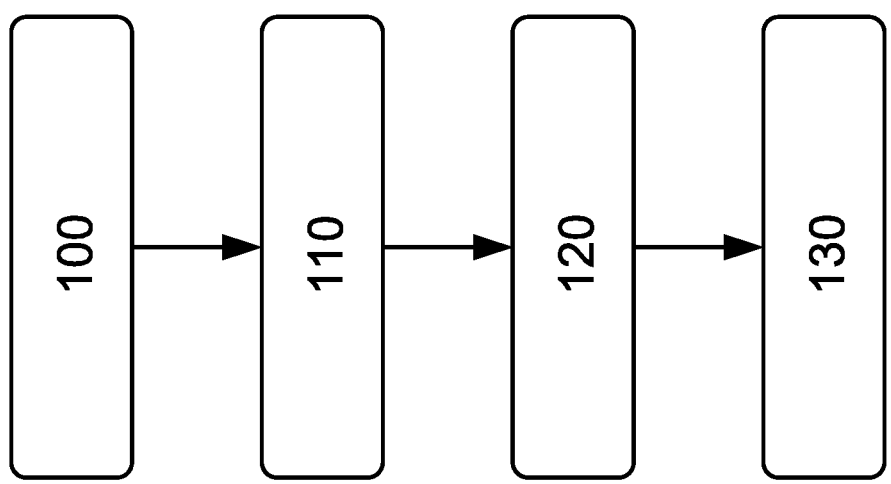

CONTACTOR CONTROL SYSTEM AND METHOD FOR CONTROLLING A CONTACTOR

RELATED APPLICATION DATA

This application is a continuation of International Patent Application No. PCT/CN2018/114892, filed Nov. 9, 2018, which claims the benefit of European Patent Application No. 17201270.0, filed Nov. 13, 2017, the disclosures of which are incorporated herein by reference in their entireties.

TECHNICAL FIELD

The present invention relates to a contactor control system for an electric or hybrid vehicle, and a method for controlling a contactor in an electric or hybrid vehicle. A contactor is controlled to connect the high voltage battery to the high voltage load when the voltage difference between the sides of the contactor is below a predefined voltage value.

BACKGROUND ART

Vehicles comprising an internal combustion engine are subjected to a plurality of different legislative requirements and regulations. Some of these requirements and regulations are directed to fuel consumption and exhaust emission. Different countries or markets may have different requirements. One measure that is used to reduce fuel consumption and exhaust emissions is to provide the vehicle with an electric motor. The vehicle may be fully electric or may be a hybrid vehicle comprising both an electric machine and an internal combustion engine.

Such a vehicle is provided with a high voltage battery adapted to power high energy components such as an electric motor, a climate control unit, active suspension etc., i.e. components that would draw a very high current from a low voltage battery. These components are for this reason powered from a high voltage battery having a voltage of 200-300 volts or more. The vehicle is further provided with a low voltage battery adapted to power low energy components of the vehicle, such as electronic control units, entertainment systems, fans, the instrument cluster etc.

The vehicle is provided with a high voltage capacitor connected in parallel with the high voltage load. Such a capacitor is known as an X-capacitor or a DC-link capacitor. The capacitor is adapted to reduce and absorb transients at the high voltage load caused by e.g. an PWM inverter that drives the electric motor, and to stabilize the voltage at the high voltage load. The vehicle is further provided with a high current switching element such as a contactor which is used to connect and disconnect the high voltage load to and from the high voltage battery. In this way, no high voltage will be present on any load terminals when the vehicle is stopped for safety reasons. Further, a discharge circuit will discharge the DC-link capacitor such that there is no dangerous voltage or charge left in the capacitor.

When the vehicle is started, the high voltage battery must be connected to the high voltage load with the switching element. However, since the DC-link capacitor has been discharged, and since the DC-link capacitor is relatively large, a high current peak will run through the contactor which will wear the contact points in the contactor. A DC-link capacitor value of between 600-1200 µF is common, and the high voltage battery is not current limited and has a very low internal resistance.

It is thus known to use a pre-charge circuit to pre-charge the DC-link capacitor with a voltage close to the voltage of the high voltage battery. Such a pre-charge circuit may be provided with a current limiting resistor, which together with the DC-link capacitor creates a RC-circuit which pre-charges the DC-link capacitor. Due to the time constant of the circuit, the pre-charge voltage will normally reach ca 90% of the high voltage battery when the switching member connects the high voltage battery to the high voltage load. This will reduce the current flow when the switching member is closed.

It is also known to use a DC/DC-converter to pre-charge the DC-link capacitor. In this case, a DC/DC-converter is powered from a low voltage battery and will supply a high voltage to the DC-link capacitor. When the voltage of the DC-link capacitor has reached a predefined voltage level, the switching member can be closed. This will reduce the current surge through the switching member. US 2016/0023559 A1, U.S. Pat. No. 9,413,184 B2 and WO 2015/086179 A1 all shows examples of a vehicle provided with a pre-charge circuit comprising a DC/DC-converter.

When the vehicle is stopped, the DC-link capacitor must be discharged. The discharge of the DC-link capacitor is often made through a discharge resistor, which creates a RC-circuit when it is connected to the DC-link capacitor. The DC-link capacitor may also be discharged through an inverter comprising e.g. IGBT or MosFet components. This will allow the DC-link capacitor to be discharged in a relatively short time. This circuit will discharge the DC-link capacitor completely, and the discharged energy will be turned into heat in the resistor.

There is thus room for an improved contactor control system for a vehicle.

DISCLOSURE OF INVENTION

An object of the invention is therefore to provide an improved contactor control system that will reduce energy losses when starting and stopping a vehicle. A further object of the invention is to provide an improved method for charging and discharging a DC-link capacitor in a vehicle.

The solution to the problem according to the invention is described in the independent claims that are appended hereto. The other claims contain advantageous further developments of the inventive voltage supply unit and the vehicle.

In a contactor control system comprising a switching member, a high voltage load, a high voltage energy storage, a bi-directional DC/DC-converter operatively connected to the switching member, a high-voltage capacitor operatively connected to the high-voltage load, and a low voltage energy storage operatively connected to the bi-directional DC/DC-converter, wherein the switching member is adapted to connect and disconnect the high voltage energy storage to and from the high voltage load, the object of the invention is achieved in that the bi-directional DC/DC-converter is configured to pre-charge the high-voltage capacitor to a predefined voltage value from the low voltage energy storage before the switching member is closed and configured to discharge the high-voltage capacitor to the low voltage energy storage when the switching member has been opened.

By this first embodiment of a contactor control system according to the invention, a contactor control system which will control a bi-directional DC/DC-converter for both pre-charging of a DC-link capacitor and for discharging a DC-link capacitor is provided. This will minimize the wear of the switching member and will further reduce the energy loss during pre-charge and discharge of the DC-link capacitor.

In order to minimize the wear of the switching member, and thus to reduce the energy loss, it is important that the voltage on the input side and the voltage on the output side are similar or equal. In pre-charge circuits using a current limiting resistor, the voltage difference may be up to 10% when the switching member is closed. In one example, the voltage difference is set to be zero, i.e. the DC/DC-converter is set to pre-charge the DC-link capacitor to a voltage that equals the voltage of the high voltage load. The system is provided with two voltage sensors. A first voltage sensor measures the voltage on the output side of the switching member, i.e. the voltage of the DC-link capacitor and the DC/DC-converter, and a second voltage sensor measures the voltage on the input side of the switching member, i.e. the voltage of the high voltage load.

A control unit receives the measured voltage values and determines when the switching member can be closed. It may be difficult to determine when the voltage on the input side and the voltage on the output side are exactly equal, due to noise and disturbances in the electrical system and due to the resolution in the measuring system. An 8-bit AD-converter will e.g. give a resolution that is larger than 1 volt in a 400 volt system. The predefined voltage value can for this reason be provided with a tolerance. The tolerance may e.g. be set to 1 or 2 volts, or to e.g. 1% of the voltage of the high voltage load.

In one example, the predefined voltage is set to be higher than the voltage of the high voltage load. By pre-charging the DC-link capacitor to a voltage that is slightly higher than the voltage of the high voltage load, the wear on the switching member is reduced. The current peak that can be delivered by the DC-link capacitor will be smaller than the current peak that can be delivered by the high voltage load when the voltage of the high voltage storage is slightly higher with the same voltage difference.

In one example, the predefined voltage value is set to alternate between a voltage value that is sometimes lower than the voltage of the high voltage storage and that is sometimes higher than the voltage of the high voltage load. In this way, the wear on each contact point of the switching member is reduced, since the current peaks are distributed to both contact points of the switching member. In one example, the voltage alternates between a higher value and a lower value every second time the switching member is closed, but the alternation may be set to any suitable number.

The DC/DC-converter is further used to discharge the DC-link capacitor to a low voltage storage, in order to reduce the energy loss. When the vehicle is stopped, and the switching member is opened, the DC-link capacitor must be discharged. By discharging the DC-link capacitor through the DC/DC-converter, the energy stored in the DC-link capacitor can be used to charge the low voltage storage.

In one example, the voltage of the DC-link capacitor can be set to a voltage value that differs from zero, i.e. the DC-link capacitor is not completely discharged. This will allow the system to reduce the energy losses further. In e.g. a 400 volt system, the DC-link capacitor may be discharged to a voltage value of 48 volts, which is considered to be a safe voltage and which is a voltage that may be present on the connector terminals of the vehicle. By the next start of the vehicle, the DC/DC-converter must pre-charge the DC-link capacitor from 48 volts instead of from 0 volts, which saves time and energy.

In one example, a delay time is applied to the discharging of the DC-link capacitor. In this example, the DC-link capacitor is not discharged directly when the switching member is opened. This is of advantage when the vehicle is stopped for a shorter period, e.g. when the driver makes a quick stop to buy something at a fast food restaurant, or when a hybrid vehicle stops at a gas station. The delay time may e.g. be a few minutes or up to e.g. half an hour. When the delay time has passed, the DC-link capacitor is discharged by the DC/DC-converter to the low energy storage.

In one example, the bi-directional DC/DC converter is configured to charge the low-voltage energy storage from the high-voltage capacitor. The energy from the high-voltage capacitor is thus kept in the system and not burned off in any component and the energy consumption of the system could be lowered.

In one example, the bi-directional DC/DC converter is configured to charge the low-voltage energy storage from the high-voltage capacitor when the switching member has been opened.

In a method for charging and discharging a high-voltage capacitor in a vehicle comprising a high voltage load and a high voltage energy storage, the steps of pre-charging the high-voltage capacitor with a bidirectional DC/DC-converter from a low voltage energy storage before the vehicle is started, connecting the high voltage energy storage to the high voltage load with a switching member when the voltage difference between the input side and the output side of the switching member is below a predefined value, disconnecting the high voltage energy storage from the high voltage load after the vehicle is stopped, and discharging the high-voltage capacitor with the bidirectional DC/DC-converter to the low voltage energy storage, are comprised.

By this first embodiment of the method, the method will be able to reduce the energy losses in the vehicle during pre-charge and discharge of the DC-link capacitor. The DC-link capacitor is pre-charged from a low voltage energy storage, and the DC-link capacitor is discharged to the low voltage energy storage.

In one example, the method comprise the additional step of: charging the low-voltage energy storage with the bidirectional DC/DC-converter from the high-voltage capacitor.

In one example, the step of charging the low-voltage energy storage with the bidirectional DC/DC-converter from the high-voltage capacitor is performed after the step of charging the low-voltage energy storage with the bidirectional DC/DC-converter from the high-voltage capacitor.

In one example, the step of charging the low-voltage energy storage with the bidirectional DC/DC-converter from the high-voltage capacitor is performed after the step of disconnecting the high voltage energy storage from the high voltage load after the vehicle is stopped.

BRIEF DESCRIPTION OF DRAWINGS

The invention will be described in greater detail in the following, with reference to the attached drawings, in which FIG. 3 shows a flow chart of an inventive method for charging and discharging a DC-link capacitor according to the invention.

MODES FOR CARRYING OUT THE INVENTION

The embodiments of the invention with further developments described in the following are to be regarded only as examples and are in no way to limit the scope of the protection provided by the patent claims. In the described example, the switch control system is used in a vehicle, but the switch control system could be used for any kind of equipment where a high voltage energy storage is to be connected to a high voltage load comprising a relatively large capacitor.

Figure 1:
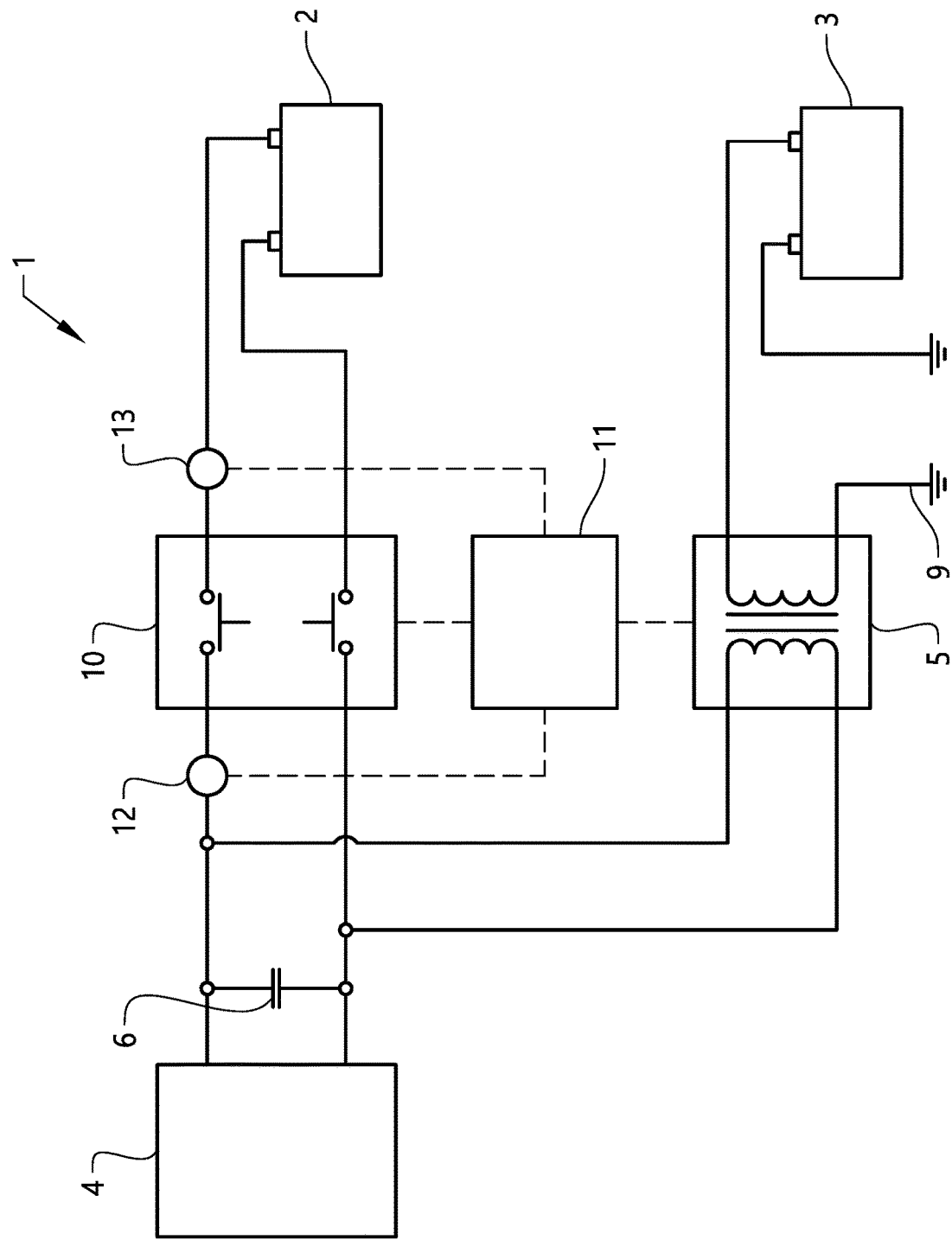
FIG. 1 shows a schematic switch control system according to the invention.

FIG. 1 shows a schematic switch control system 1 which comprises a high voltage energy storage 2, a low voltage energy storage 3, a high voltage load 4, a bi-directional DC/DC-converter 5, a high-voltage DC-link capacitor 6, and a high voltage switching member 10. The high voltage energy storage is in this example a high voltage battery, e.g. a lithium-ion battery, having a nominal voltage of approximately 400 volts. The low voltage energy storage is in this example a 12 volt lead acid battery, but other types of batteries are also possible, as well as a battery connected in parallel with a super capacitor. It is also possible to use a lead acid battery and a lithium-ion battery in parallel, where the batteries are separated by e.g. a diode. The bi-directional DC/DC-converter is adapted to step-up the voltage from the low voltage battery to a voltage corresponding to the voltage of the high voltage battery, in this example to 400 volts. The bi-directional DC/DC-converter is further adapted to step-down the voltage of the DC-link capacitor to a voltage corresponding to the voltage of the low voltage battery, in this example to 12 volts.

By the use of the bi-directional DC/DC-converter, it is possible to transfer energy from the low voltage battery to the high voltage DC-link capacitor and also to the high voltage load or even to the high voltage battery, and to transfer energy from the DC-link capacitor and also from the high voltage battery to the low voltage battery. It would e.g. be possible to charge the low voltage battery from the high voltage battery if the low voltage battery is empty, and to provide high voltage to the high voltage load from the low voltage battery if the high voltage battery is completely drained.

The high-voltage DC-link capacitor 6 is connected in parallel with the high-voltage load 4. The high-voltage load comprises an electric machine adapted to propel the vehicle, but may also comprise a compressor or a heater, or any other high energy component. The DC-link capacitor is adapted to reduce and absorb transients at the high voltage load caused by e.g. an PWM inverter that drives the electric motor, and to stabilize the voltage at the high voltage load. A DC-link capacitor is normally in the range between 600 µF-1200 µF. The capacitor value is a compromise between the charge time of the capacitor and the stabilization of the high voltage. A larger capacitor value will give a better filtration of the high voltage and thus a smoother and more stable high voltage, but will increase the charge time of the capacitor when a regular pre-charge circuit is used. With the inventive pre-charge method, a larger capacitor value can be used if required, without affecting the pre-charge time.

The DC-link capacitor is pre-charged to a predefined voltage value when the vehicle is started. The predefined voltage should be ideally be identical to the voltage of the high voltage energy storage, such that there will be no energy transfer from the high voltage energy storage to the DC-link capacitor when the switching member is closed. A voltage difference over the switching member will induce a spark in the connector terminals of the switching member, which will wear the connector terminals. A further advantage of pre-charging the DC-link capacitor to the same voltage as the high voltage energy storage is that the induced electromagnetic interference (EMI) is reduced.

In order to minimize the wear of the connector terminals, which will also reduce the energy loss, it is of advantage that the voltage difference between the input side of the switching member and the output side of the switching member is as small as possible. In one example, the voltage difference is set to be zero, i.e. the DC/DC-converter is set to pre-charge the DC-link capacitor to a voltage that equals the voltage of the high voltage load. The system is provided with two voltage sensors, a first voltage sensor 12 that is adapted to measures the voltage on the output side 8 of the switching member 10, i.e. the voltage of the DC-link capacitor 4, and a second voltage sensor 13 measures the voltage on the input side 7 of the switching member 10, i.e. the voltage of the high voltage load 2.

A switch control unit 11 receives the measured voltage values and determines when the switching member 10 can be closed. It may be difficult to determine when the voltage on the input side and the voltage on the output side are exactly equal, due to noise and disturbances in the electrical system and due to the resolution in the measuring system. An 8-bit AD-converter will e.g. give a resolution that is larger than 1 volt in a 400 volt system. The predefined voltage value can for this reason be provided with an allowed tolerance. The tolerance may be set to a few volts, e.g. 1 or 2 volts, or to e.g. 1% of the voltage of the high voltage load. The tolerance span is set depending e.g. on the voltage of the high voltage load and on the measuring resolution of the control system.

The voltage difference between the input side and the output side of the switching member will cause a spark between the contact terminals of the switching member. This spark will wear the contact terminals and may eventually break the switching member down. In one example, the predefined voltage is set to be higher than the voltage of the high voltage load. By pre-charging the DC-link capacitor to a voltage that is slightly higher than the voltage of the high voltage load, the wear on the switching member is reduced. The current peak that can be delivered by the DC-link capacitor will be smaller than the current peak that can be delivered by the high voltage load when the voltage of the high voltage storage is slightly higher with the same voltage difference. This will thus reduce the wear of the switching member.

In one example, the predefined voltage value of the DC-link capacitor is set to alternate between a voltage value that is sometimes lower than the voltage of the high voltage storage and that is sometimes higher than the voltage of the high voltage load. In this way, the wear on each contact terminal of the switching member is reduced, since the current peaks are distributed to both contact terminals of the switching member. The predefined voltage value may alternate between a higher value and a lower value every second time the switching member is closed, but the alternation period may be set to any suitable number.

When the switching member has been closed and the high-voltage energy storage is connected to the high-voltage load, the bi-directional DC/DC-converter is shut off. If necessary, the bi-directional DC/DC-converter may be used to charge the low voltage energy storage when the vehicle is driving.

When the vehicle is stopped and is not to be used for a while, the high-voltage load must be disconnected from the high-voltage energy storage. Here, the switching member can be opened without inducing a spark since the voltage on the input side and the output side of the switching member is the same. When the switching member has been opened, the high voltage in the DC-link capacitor will remain. The DC-link capacitor should be drained in order to avoid dangerous situations, e.g. when a user opens the bonnet and accidently touches a contact point of the high voltage load.

The bi-directional DC/DC-converter is for this reason adapted to discharge the DC-link capacitor to the low voltage storage, in order to reduce the energy loss. By discharging the DC-link capacitor through the DC/DC-converter, the energy stored in the DC-link capacitor can be used to charge the low voltage storage.

In one example, the discharge voltage of the DC-link capacitor can be set to a voltage value that differs from zero, i.e. the DC-link capacitor is not completely discharged. This will allow the system to reduce the energy losses further. In e.g. a 400 volt system, the DC-link capacitor may be discharged to a voltage value of 48 volts, which is considered to be a safe voltage and which is a voltage that may be present on the connector terminals of the vehicle. By the next start of the vehicle, the DC/DC-converter must pre-charge the DC-link capacitor from 48 volts instead of from 0 volts, which saves time and energy.

In one example, a delay time is applied to the discharge process of the DC-link capacitor. In this example, the DC-link capacitor is not discharged directly when the switching member is opened. This is of advantage when the vehicle is stopped for a shorter period, e.g. when the driver makes a quick stop to buy something at a fast food restaurant, or when a hybrid vehicle stops at a gas station. The delay time may e.g. be a few minutes or up to e.g. half an hour. When the delay time has passed, the DC-link capacitor is discharged by the DC/DC-converter to the low energy storage.

In one example, the bi-directional DC/DC converter is configured to charge the low-voltage energy storage from the high-voltage capacitor. This enables that the energy from the high-voltage capacitor is kept in the system and not burned off in any component and the energy consumption of the system could be lowered.

In one example, the bi-directional DC/DC converter is configured to charge the low-voltage energy storage from the high-voltage capacitor when the switching member has been opened.

Figure 2:
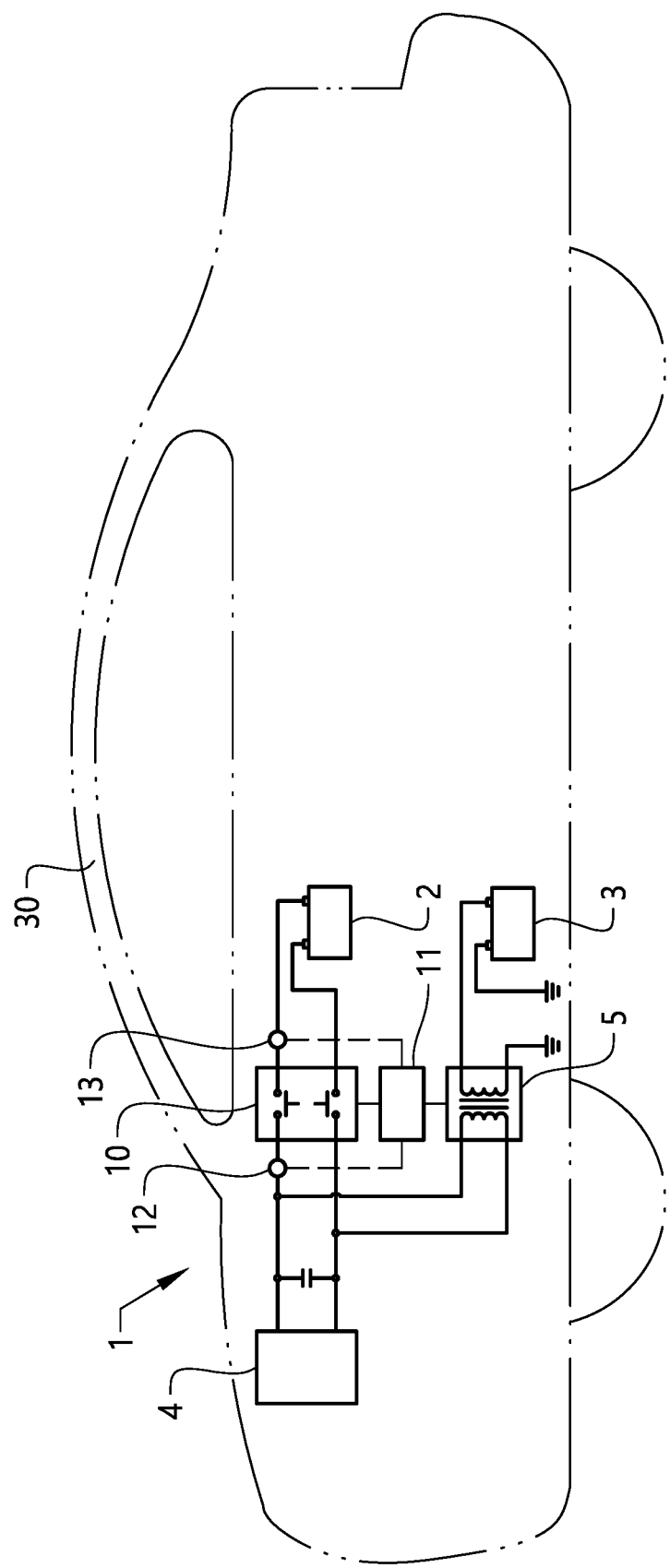
FIG. 2 shows a schematic vehicle comprising a switch control system according to the invention.

FIG. 2 shows a vehicle 30 comprising a switch control system 1 according to the invention. The switch control system may be positioned at any suitable place in the vehicle, but is preferably arranged close to the high-voltage energy storage or the high voltage load in order to minimize the cable length of the high voltage cables. Both the high side and the low side of the high voltage require a separate cable. The low voltage system is provided with a ground connection 9.

FIG. 3 shows a schematic flow chart of the method for charging and discharging a high-voltage capacitor in a vehicle comprising a high voltage load and a high voltage energy storage. The method is performed before the vehicle is started and after the vehicle has been stopped, and the vehicle may be a pure electric vehicle or may be a hybrid vehicle. The method steps are preferably performed by a computer program and a computer program product contained and run in the electronic control unit of the vehicle.

In step 100, the DC-link high-voltage capacitor is pre-charge with a bidirectional DC/DC-converter from a low voltage energy storage before the vehicle is started. When a pure electric vehicle is to be started, an activation switch is activated which sets the vehicle in a stand-by mode. For a hybrid vehicle, the ignition switch is set to a first position. The low voltage electric system of the vehicle is now active, such that lamps, entertainment system, navigation etc. are active. At the same time, the DC-link capacitor is pre-charge with a bidirectional DC/DC-converter from a low voltage energy storage. The DC-link capacitor is pre-charge to substantially the same voltage as the high voltage energy storage.

In step 110, the high voltage energy storage is connected to the high voltage load with a switching member. The switching member is closed when the voltage difference between the input side and the output side of the switching member is below a predefined value. The vehicle is now ready to be driven by a user.

In step 120, the vehicle has been stopped. The activation switch or the ignition switch has been turned to an off-position, indicating that the vehicle will not be used for a while and that is to be shut-off. The high voltage energy storage will now be disconnected from the high voltage load.

In step 130, the DC-link capacitor is discharged with the bidirectional DC/DC-converter. The voltage of the DC-link capacitor is transformed to the voltage of the low voltage energy storage by the bi-directional DC/DC-converter, such that the energy of the DC-link capacitor is transferred to the low voltage energy storage. The switch control unit can then be switched off as well.

In one example, the method comprise the additional step of: charging the low-voltage energy storage 3 with the bidirectional DC/DC-converter 5 from the high-voltage capacitor 6.

In one example, the step of charging the low-voltage energy storage 3 with the bidirectional DC/DC-converter 5 from the high-voltage capacitor 6 is performed after the step of charging the low-voltage energy storage 3 with the bidirectional DC/DC-converter from the high-voltage capacitor 6.

In one example, the step of charging the low-voltage energy storage 3 with the bidirectional DC/DC-converter 5 from the high-voltage capacitor 6 is performed after the step of disconnecting the high voltage energy storage from the high voltage load after the vehicle is stopped.

The invention is not to be regarded as being limited to the embodiments described above, a number of additional variants and modifications being possible within the scope of the subsequent patent claims.

REFERENCE SIGNS

1: Switch control system
2: High voltage battery
3: Low voltage battery
4: High voltage load
5: Bi-directional DC/DC converter
6: DC-link capacitor
7: Input side
8: Output side
9: Ground
10: High voltage switching member
11: Switch control unit
12: First voltage sensor
13: Second voltage sensor
30: Vehicle

The invention claimed is:

1. A vehicle, wherein the vehicle comprises:
a switch control system, comprising:
a switching member,
a high voltage load,
a high voltage energy storage,
a bi-directional DC/DC-converter operatively connected to the switching member, a high-voltage capacitor operatively connected to the high-voltage load, and a low voltage energy storage operatively connected to the bi-directional DC/DC-converter, wherein the switching member connects and disconnects the high voltage energy storage to and from the high voltage load, wherein the bi-directional DC/DC-converter pre-charges the high-voltage capacitor to a predefined voltage value from the low voltage energy storage before the switching member is closed, and discharges the high-voltage capacitor to the low voltage energy storage when the switching member has been opened, and wherein the predefined voltage value is set higher than the voltage of the high-voltage energy storage at one start moment of the vehicle, and wherein the predefined voltage value is set lower than the voltage of the high-voltage energy storage at a different start moment of the vehicle.

2. The vehicle according to claim 1, wherein the switch control system comprises a first voltage sensor operatively connected to a first side of the switching member and a second voltage sensor operatively connected to a second side of the switching member.

3. The vehicle according to claim 2, wherein the switch control system comprises a control unit adapted to receive voltage values from the first voltage sensor and the second voltage sensor, to determine the predefined voltage value and to control the switching member in dependency of the determined predefined voltage value.

4. The vehicle according to claim 1, wherein the predefined voltage value is dependent on the voltage of the high-voltage energy storage.

5. The vehicle according to claim 1, wherein the low-voltage energy storage consists of a first lead-acid battery and a second different low-voltage energy storage.

6. The vehicle according to claim 1, wherein the bi-directional DC/DC converter is configured to charge the low-voltage energy storage from the high-voltage capacitor.

7. The vehicle according to claim 6, wherein the bi-directional DC/DC converter is configured to charge the low-voltage energy storage from the high-voltage capacitor when the switching member has been opened.

8. The vehicle according to claim 1, wherein the vehicle is a hybrid vehicle.

9. A method for charging and discharging a high-voltage capacitor in a vehicle comprising a high voltage load with a high-voltage capacitor, and a high voltage energy storage, comprising the steps of:

pre-charging the high-voltage capacitor to a predefined voltage value with a bidirectional DC/DC-converter from a low voltage energy storage before the vehicle is started, connecting the high voltage energy storage to the high voltage load with a switching member when the voltage difference between the input side and the output side of the switching member is below a predefined value, disconnecting the high voltage energy storage from the high voltage load after the vehicle is stopped, and discharging the high-voltage capacitor with the bidirectional DC/DC-converter to the low voltage energy storage, and wherein the predefined voltage value is higher than the voltage of the high-voltage energy storage at one start moment of the vehicle, and wherein the predefined voltage value is lower than the voltage of the high-voltage energy storage at another start moment of the vehicle.

10. The method according to claim 9, comprising the additional step of: waiting a predefined time interval before the high-voltage capacitor is discharged with the bi-directional DC/DC-converter.

11. The method according to claim 9, comprising the additional step of: charging the low-voltage energy storage with the bidirectional DC/DC-converter from the high-voltage capacitor.

12. The method according to claim 11, wherein the step of charging the low-voltage energy storage with the bidirectional DC/DC-converter from the high-voltage capacitor is performed after the step of charging the low-voltage energy storage with the bidirectional DC/DC-converter from the high-voltage capacitor.

13. The method according to claim 11, wherein the step of charging the low-voltage energy storage with the bidirectional DC/DC-converter from the high-voltage capacitor is performed after the step of disconnecting the high voltage energy storage from the high voltage load after the vehicle is stopped.

14. A non-transitory computer readable medium storing a computer program comprising program code for performing the steps of claim 9 when said program is run on a computer.

* * * * *